United States Patent [19]
Wittenbrink et al.

[11] Patent Number: 6,096,690
[45] Date of Patent: Aug. 1, 2000

[54] HIGH PERFORMANCE ENVIRONMENTALLY FRIENDLY DRILLING FLUIDS

[75] Inventors: Robert Jay Wittenbrink; Charles John Mart; Daniel Francis Ryan, all of Baton Rouge, La.; Bruce Randall Cook, Pittstown, N.J.

[73] Assignee: Exxon Research and Engineering Co., Florham Park, N.J.

[21] Appl. No.: 09/083,489

[22] Filed: May 22, 1998

Related U.S. Application Data

[63] Continuation-in-part of application No. 08/620,983, Mar. 22, 1996, abandoned.

[51] Int. Cl.⁷ .................. C09K 7/00; C09K 7/06; C07C 7/20
[52] U.S. Cl. .................. 507/103; 585/1; 585/734; 585/739; 208/14
[58] Field of Search ........................ 507/103; 585/1, 585/734, 739; 204/14; 166/305.1

[56] References Cited

U.S. PATENT DOCUMENTS

| | | | |
|---|---|---|---|
| 5,096,883 | 3/1992 | Mercer et al. | 507/103 |
| 5,189,012 | 2/1993 | Patel et al. | 507/103 |
| 5,498,596 | 3/1996 | Ashjian et al. | 507/103 |
| 5,569,642 | 10/1996 | Lin | 507/103 |
| 5,750,819 | 5/1998 | Wittenbrink et al. | 585/734 |
| 5,866,748 | 2/1999 | Wittenbrink et al. | 585/734 |
| 5,958,845 | 9/1999 | Van Slyke | 507/103 |

FOREIGN PATENT DOCUMENTS

| | | | |
|---|---|---|---|
| 2117429A | 10/1983 | United Kingdom | C09K 7/06 |
| WO95/06694 | 3/1995 | WIPO | C09K 7/06 |
| WO95/09215 | 4/1995 | WIPO | C09K 7/00 |
| WO97/21787 | 6/1997 | WIPO | C10G 45/58 |

*Primary Examiner*—Philip Tucker
*Attorney, Agent, or Firm*—Jay Simon; Jonathan N. Provoost

[57] ABSTRACT

Discloses environmentally friendly, low temperature base oils and drilling fluids, or drilling mud compositions useful in the production of oil and gas. The drilling fluid is constituted of one or more of weighting agents, emulsifiers, wetting agents, viscosifiers, fluid loss control agents, proppants, and other particulates such as used in a gravel pack, emulsified with a paraffinic solvent composition which forms a continuous oil phase, or water-in-oil invert phase. The solvent composition is constituted of a mixture of $C_{10}$–$C_{24}$ n-paraffins and isoparaffins having an isoparaffin:n-paraffin molar ratio ranging from about 0.5:1 to about 9:1, the isoparaffins of the mixture contain greater than 30 percent, preferably from about 30 percent to about 50 percent, of mono-methyl species, and greater than 30 percent, preferably from about 30 percent to about 50 percent of multi-methyl branched species and isoparaffins which contain one or more branches of carbon number higher than methyl, based on the total weight of the isoparaffins in the mixture. The presence of the mono-methyl species is sufficient to provide the admirable environmentally friendly qualities, and the multi-methyl branched and isoparaffin species more highly branched than methyl provide low temperature properties.

6 Claims, No Drawings

HIGH PERFORMANCE ENVIRONMENTALLY FRIENDLY DRILLING FLUIDS

1. RELATED INVENTION

This is a continuation-in-part of application Ser. No. 08/620,983, filed Mar. 22, 1996 by Robert J. Wittenbrink et al now abandoned. The Application is titled "High Performance Environmentally Friendly Drilling Fluids."

2. FIELD OF THE INVENTION

This invention relates to base oils and drilling fluids or muds made from such base oils, which are substantially non-toxic, essentially non-polluting, biodegradable and highly useful in low temperature operations.

3. BACKGROUND

In pending U.S. application Ser. No. 08/620,983, filed Mar. 22, 1996, abandoned, supra, there is disclosed base oils which are non-toxic, non-polluting, biodegradable and suitable for use in forming drilling fluid compositions by dispersing therein at least one additive selected from the group consisting of weighting agents, emulsifiers, wetting agents, viscosifiers, fluid loss control agents, proppants and other particulate agents. In forming the drilling fluids a continuous oil phase, or water-in-oil invert emulsion phase (where water or brine is present and emulsified in the solvent), provide a medium for the dispersed additive, or additives. The base oil is constituted of a mixture of normal paraffins (n-paraffins) and isoparaffins having from about 10 to about 24 carbon atoms, i.e., $C_{10}$–$C_{24}$ n-paraffins and isoparaffins, preferably $C_{12}$–$C_{18}$ paraffins, having an isoparaffin:n-paraffins molar ratio ranging generally from about 0.5:1 to about 9:1, and the isoparaffins of the mixture contain greater than 50 percent, generally 70 percent, by weight of the isoparaffins in the mixture, of mono-methyl species, e.g., 2-methyl, 3-methyl, 4-methyl, $\geq$5-methyl or the like, with minimal formation of isoparaffins having branches with substituent groups of carbon number greater than 1, e.g., ethyl, propyl, butyl or the like.

These base oils form high performance drilling fluids of low toxicity, and they are environmentally friendly. Like conventional diesel fuels they form drilling fluids, or muds, which have excellent rheological properties for rotary drilling, but unlike conventional diesel fuels do not pose a serious and costly disposal problem for offshore operators. Thus, with conventional diesel operators must barge spent mud and cuttings to shore for land disposal, because diesel fuel cannot meet U.S. Environmental Protection Agency Standards regarding discharge limitations and/or permit requirements. In contrast, this new base oil admirably meets this need, and provides excellent Theological properties. However, the oil and drilling fluids made from the new base oil is lacking in that it is of low pour point, and its low temperature performance leaves much to be desired. It does not perform well under cold temperature conditions which are frequently encountered in drilling operations, e.g., in Alaskan or North Sea operations. Accordingly, there remains a need for a further improved base oil; and drilling fluid made from such base oil, of low toxicity, biodegradable, and environmentally friendly, but yet will be useful at low temperature conditions.

4. SUMMARY OF THE INVENTION

This invention, which supplies this need and others, accordingly relates to a substantially non-toxic, essentially non-polluting, biodegradable, low temperature base oil, and drilling fluid, or mud composition made by dispersing in said base oil one or more of the weighting agents, emulsifiers, wetting agents, viscosifiers, fluid loss control agents, proppants, and particulate agents are mixed with the paraffinic solvent composition to form an emulsion in which the latter forms a continuous oil phase, or water-in-oil invert emulsion phase.

The base oil is constituted of a mixture of n-paraffins and isoparaffins ranging from about $C_{10}$ to about $C_{24}$, preferably from about $C_{12}$ to about $C_{18}$, wherein the isoparaffins component of the mixture contains at least about 30 percent, preferably from about 30 percent to about 50 percent, based on the weight of the isoparaffins component in the mixture, of the mono-methyl species (e.g., 2-methyl, 3-methyl, 4-methyl, $\geq$5-methyl or the like), and at least 30 percent, preferably from about 30 percent to about 50 percent, based on the weight of the isoparaffins component in the mixture, of isoparaffins which are of a multi-methyl branched species (e.g., dimethyl, trimethyl, etc.), or contains one or more branches of carbon number higher than methyl (e.g., ethyl, propyl, etc.), or both. The base oil composition has a molar isoparaffin:n-paraffin ratio ranging from about 0.5:1 to about 9:1, preferably from about 1:1 to about 3:1, and boils within a range of from about 320° F. to about 700° F., preferably from about 500° to about 700° F. The presence of these concentrations of multi-methyl branched isoparaffins, or isoparaffins with branches of higher carbon number than methyl in the mixture effectively increases the low temperature performance of a drilling fluid made from such base oil thereby enabling use of the drilling fluid under cold temperature conditions; and yet, the drilling fluid retains its desirable high performance and outstanding environmental characteristics.

The $C_{10}$–$C_{24}$, or $C_{12}$–$C_{18}$ solvent composition of the drilling fluid, or drilling mud, in all embodiments constitutes, a continuous liquid phase, or continuous invert emulsion phase where water or brine is present and emulsified within the solvent composition. Where water is present, the solvent:water volume ratio generally ranges from about 90:10 to about 60:40; preferably from about 80:20 to about 70:30.

The continuous, or invert emulsion phase of the drilling fluid, or drilling mud, of this invention is emulsified by dispersing therein at least one additive selected from the group consisting of weighting agents, emulsifiers, wetting agents, viscosifiers, fluid loss control agents, proppants for use in fracturing subterranean formations, and particulate agents as used in gravel packs.

In forming the drilling fluid, or mud, generally one or more of the weighting agents, emulsifiers, wetting agents, viscosifiers, fluid loss control agents, proppants, and particulate agents are mixed with the paraffinic solvent composition to form an emulsion in which the latter forms a continuous oil phase, or water-in-oil invert emulsion phase. In such systems, the high purity solvent composition constitutes generally from about 50 percent to about 95 percent, and more often and preferably, from about 60 percent to about 80 percent of the total drilling fluid, or mud, based on the total volume of the composition; with the balance of the drilling fluid, or mud, being water, brine or other additive, or additives. A drilling fluid, or mud, of this character provides excellent rheological properties under a wide variety of drilling conditions. Exemplary of additives useful in the practice of this invention are: weighting materials such as barite, iron oxide, calcium oxide, etc.; emulsifiers such as fatty acids, soaps of fatty acids, and fatty acid derivatives such as a amido-amines, polyamides, polyamines, esters, e.g., sorbitan monoleate polyethoxylate, etc.; wetting agents such as crude tall oil, organic phosphate esters, modified imidazolines and amido-amines, alkyl aromatic sulfates and sulfonates, etc.; viscosifiers such as organophilic clays, oil soluble polymers, polyamide resins, polycarboxylic acids and soaps, etc.; fluid loss control materials such as modified lignites, polymers, asphaltic compounds and the like, etc.; proppant materials such as sand grains, walnut shells, etc.; gravel and the like. Water, or brine, as suggested, can also be present in or added to the drilling fluid, or mud. Typically, the weighting agent is added in concentrations ranging up to about 18 pounds per barrel of paraffinic solvent; the emulsifiers and wetting agents, respectively, in concentrations ranging from about 2 to about 6 pounds, per barrel of paraffinic solvent; the viscosifiers in concentrations ranging from about 1 to about 10 pounds per barrel of paraffinic solvent; and the fluid loss control agents in concentrations ranging from about 1 to about 20 pounds per barrel of paraffinic solvent.

5. DETAILED DESCRIPTION

The paraffinic oil base, or solvent, component for the drilling fluid, or mud, can be obtained from a Fischer-Tropsch reaction product or wax, or from slack waxes which serve as feeds for the production of the solvent component of the mud. The solvent component is produced by the hydrocracking and hydroisomerization of $C_5+$ paraffinic, or waxy hydrocarbon feeds, especially Fischer-Tropsch waxes, or reaction products at least a fraction of which boils above 700° F., i.e., at 700° F.+. The waxy feed is contacted, with hydrogen, over a dual functional catalyst to produce hydroisomerization and hydro-cracking reactions sufficient to convert at least about 20 percent to about 90 percent, preferably from about 30 percent to about 80 percent, on a once through basis based on the weight of the 700° F.+ feed component, or 700° F.+feed, to 700° F.− materials, and produce a liquid product boiling from about 74° F. to about 1050° F., i.e., a $C_5$–1050° F. liquid product, or crude fraction. The $C_5$–1050° F. crude fraction is topped via atmospheric distillation to produce two fractions, (i) a low boiling fraction having an initial boiling point ranging between about 74° F. and about 100° F., and an upper end boiling point of about 700° F., and (ii) a high boiling fraction having an initial boiling point of about 700° F., and an upper end boiling point of about 1050° F., or higher, i.e., 1050° F.+. The low boiling fraction (i), or fraction boiling between about $C_5$ and about 700° F., which is constituted substantially of paraffins, provides a material from which the solvent component of the drilling fluid or mud, can be recovered, or the solvent component for the drilling fluid, or mud, may be obtained from slack waxes. Slack waxes are the by-products of dewaxing operations where a diluent such as propane or a ketone (e.g., methyl-ethyl ketone, methyl isobutyl ketone) or other diluent is employed to promote wax crystal growth, the wax being removed from the lubricating oil base stock by filtration or other suitable means. The slack waxes are generally paraffinic in nature, boil above about 600° F., preferably in the range of 600° F. to about 1050° F., and may contain from about 1 to about 35 wt. % oil. Waxes with low oil contents, e.g., 5–20 wt. % are preferred; however, waxy distillates or raffinates containing 5–45% wax may also be used as feeds. Slack waxes are usually freed of polynuclear aromatics and hetero-atom compounds by techniques known in the art; e.g., mild hydrotreating as described in U.S. Pat. No. 4,900, 707, which also reduces sulfur and nitrogen levels preferably to less than 5 ppm and less than 2 ppm, respectively.

Fischer-Tropsch waxes are preferred feed materials, having negligible amounts of aromatics, sulfur and nitrogen compounds. The Fischer-Tropsch liquid, and wax, is characterized as the product of a Fischer-Tropsch process wherein a synthetic gas, or mixture of hydrogen and carbon monoxide, is processed at elevated temperature over a supported catalyst comprised of a Group VIII metal, or metals, of the Periodic Table of The Elements (Sargent-Welch Scientific Company, Copyright 1968), e.g., cobalt, ruthenium, iron, etc. The Fischer-Tropsch liquid contains $C_5+$, preferably $C_{10}+$, more preferably $C_{20}+$ paraffins. A distillation showing the fractional make up (±10 wt. % for each fraction) of a typical Fischer-Tropsch product is as follows:

| Boiling Temperature Range | Wt. % of Fraction |
|---|---|
| IBP–320° F. | 13 |
| 320–500° F. | 23 |
| 500–700° F. | 19 |
| 700–1050° F. | 34 |
| 1050° F.+ | 11 |
| | 100 |

A 700° F.+ wax feed, or wax feed containing 700° F.+ hydrocarbons, preferably the former, is contacted, with hydrogen, at hydrocracking/hydroisomerization conditions over a bifunctional catalyst, or catalyst containing a metal, or metals, hydrogenation component and an acidic oxide support component active in producing both hydrocracking and hydroisomerization reactions. Preferably, a fixed bed of the catalyst is contacted with the feed at conditions which convert about 20 to 90 wt. %, preferably about 30 to 80 wt. % of the 700° F.+ feed (or 700° F.+ component of the feed) to a low boiling fraction having an initial boiling point of about $C_5$ (about 74° F. to about 100° F.) and an end boiling point of about 700° F., and a higher boiling fraction having an initial boiling point corresponding to the upper end boiling point of the low boiling fraction and a higher end boiling point of 1050° F., or greater. In general, the hydrocracking/hydroisomerization reaction is conducted by contacting the waxy feed over the catalyst at a controlled combination of conditions which produce these levels of conversion, e.g., by selection of temperatures ranging from about 400° F. to about 850° F., preferably from about 500° F. to about 700° F., pressures ranging generally from about 100 pounds per square inch gauge (psig) to about 1500 psig, preferably from about 300 psig to about 1000 psig, hydrogen treat gas rates ranging from about 1000 SCFB to about 10,000 SCFB, preferably from about 2000 SCFB to about 5000 SCFB, and space velocities ranging generally from about 0.5 LHSV to about 10 LHSV, preferably from about 0.5 LHSV to about 2 LHSV. Optionally, and preferably, after the hydrocracking/hydroisomerization step is completed, the high purity solvent composition that is recovered, and which is to be used as a component of the drilling fluid, or mud, is subjected to a mild hydrotreating step to ensure that the finished product is free of aromatics.

The active metal component of the catalyst used in the hydrocracking/hydroisomerization reaction is preferably a Group VIII metal, or metals, of the Periodic Table Of The Elements (Sargent-Welch Scientific Company Copyright 1968) in amount sufficient to be catalytically active for hydrocracking and hydroisomerization of the waxy feed. The catalyst may also contain, in addition to the Group VIII metal, or metals, a Group IB and/or a Group VIB metal, or metals, of the Periodic Table. Generally, metal concentrations range from about 0.05 percent to about 20 percent, based on the total weight of the catalyst (wt. %), preferably from about 0.1 wt. percent to about 10 wt. percent. Exemplary of such metals are the non-noble Group VIII metals such as nickel and cobalt, or mixtures of these metals with each other or with other metals, such as copper, a Group IB metal, or molybdenum, a Group VIB metal. Palladium and platinum are exemplary of suitable Group VIII noble metals. The metal, or metals, is incorporated with the support component of the catalyst by known methods, e.g., by impregnation of the support with a solution of a suitable salt or acid of the metal, or metals, drying and calcination.

The catalyst support is constituted of metal oxide, or metal oxides, components at least one component of which is an acidic oxide active in producing olefin cracking and hydroisomerization reactions. Exemplary oxides include silica, silica-alumina, clays, e.g., pillared clays, magnesia, titania, zirconia, halides, e.g., chlorided alumina, and the like. The catalyst support is preferably constituted of silica and alumina, a particularly preferred support being constituted of up to about 35 wt. % silica, preferably from about 2 wt. % to about 35 wt. % silica, and having the following porestructural characteristics:

| Pore Radius, Å | Pore Volume |
|---|---|
| 0–300 | >0.03 ml/g |
| 100–75,000 | <0.35 ml/g |
| 0–30 | <25% of the volume of the pores with 0–300 Å radius |
| 100–300 | <40% of the volume of the pores with 0–300 Å radius |

The base silica and alumina materials can be, e.g., soluble silica containing compounds such as alkali metal silicates (preferably where $Na_2O:SiO_2=1:2$ to 1:4), tetraalkoxy silane, orthosilic acid ester, etc.; sulfates, nitrates, or chlorides of aluminum alkali metal aluminates; or inorganic or organic salts of alkoxides or the like. When precipitating the hydrates of silica or alumina from a solution of such starting materials, a suitable acid or base is added and the pH is set within a range of about 6.0 to 11.0. Precipitation and aging are carried out, with heating, by adding an acid or base under reflux to prevent evaporation of the treating liquid and change of pH. The remainder of the support producing process is the same as those commonly employed, including filtering, drying and calcination of the support material. The support may also contain small amounts, e.g., 1–30 wt. %, of materials such as magnesia, titania, zirconia, hafnia, or the like.

Support materials and their preparation are described more fully in U.S. Pat. No. 3,843,509 incorporated herein by reference. The support materials generally have a surface area ranging from about 180–400 $m^2$/g, preferably 230–375 $m^2$/g, a pore volume generally of about 0.3 to 1.0 ml/g, preferably about 0.5 to 0.95 ml/g, bulk density of generally about 0.5–1.0 g/ml, and a side crushing strength of about 0.8 to 3.5 kg/mm.

The following examples are illustrative of the more salient features of this invention. All parts, and percentages, are given in terms of weight unless otherwise specified.

Examples a) A mixture of hydrogen and carbon monoxide synthesis gas ($H_2$:CO 2.11–2.16) was converted to heavy paraffins in a slurry Fischer-Tropsch reactor. A titania supported cobalt rhenium catalyst was utilized for the Fischer-Tropsch reaction. The reaction was conducted at 422–428° F., 287–289 psig, and the feed was introduced at a linear velocity of 12 to 17.5 cm/sec. The kinetic alpha of the Fischer-Tropsch synthesis step was 0.92. The paraffinic Fischer-Tropsch product was isolated in three nominally different boiling streams; separated by utilizing a rough flash. The three boiling fractions which were obtained were: 1) a $C_5$–500° F. boiling fraction, i.e., F-T cold separator liquids; 2) a 500–700° F. boiling fraction, i.e., F-T hot separator liquids; and 3) a 700° F.+ boiling fraction, i.e., an F-T reactor wax.

b) The 700° F.+ boiling fraction, or F-T reactor wax, having a boiling point distribution as follows: IBP-500° F., 9.9%, 500° F.–700° F., 26.9%, and 700° F.+, 63.2%, was then hydroisomerized and hydrocracked over a dual functional catalyst consisting of cobalt (CoO, 3.2 wt %) and molybdenum ($MoO_3$, 15.2 wt %) on a silica-alumina cogel acidic support, 15.5 wt % of which is $SiO_2$. The catalyst had a surface area of 266 $m^2$/g and pore volume ($PV_{H2O}$) of 0.64 ml/g. The conditions for the reaction are listed in Table 1 and were sufficient to provide approximately 50% 700° F.+ conversion where 700° F.+ conversion is defined as:

700° F.+ Conv.=[–(wt % 700° F.+ in product)/(wt % 700° F.+ in feed)×100

TABLE 1

| Operating Conditions | |
|---|---|
| Temp., ° F. | 709 |
| LHSV, v/v/h | 1.15 |
| $H_2$ Pressure, psig (pure) | 725 |
| $H_2$ Treat rate, SCF/B | 2500 | c.) The reaction product, or hydroisomerate, was then fractionated in a 15/5 distillation to yield a 500–550° F. fraction. The properties of this material are listed in Table 2 while the carbon number distribution and isoparaffin content are listed in Table 3.

TABLE 2

| Base Oil Properties | |
|---|---|
| GCD Distillation, ° F. | |
| IBP | 455 |
| 5% | 490 |
| 50% | 536 |
| 95% | 564 |
| FBP | 575 |
| Flash Point, ° F. | 225 |
| Kinematic Viscosity, cSt @ 100° F. | 2.57 |
| Kinematic Viscosity, cSt @ 120° F. | 1.76 |
| Pour Point, ° F. | –15 |
| Specific Gravity | 0.778 |

TABLE 3

| | Carbon Number Distribution | | | |
|---|---|---|---|---|
| Carbon # | n-Paraffin, wt % | mono-methyl Paraffins, wt % | Other iso-Paraffins, wt %[(1)] | Total |
| 7 | 0.004 | 0.004 | | |
| 8 | 0.001 | 0.001 | | |
| 9 | 0.004 | 0.003 | | 0.007 |
| 10 | 0.006 | 0.003 | | 0.009 |
| 11 | 0.007 | 0.004 | | 0.011 |

TABLE 3-continued

Carbon Number Distribution

| Carbon # | n-Paraffin, wt % | mono-methyl Paraffins, wt % | Other iso-Paraffins, wt %[(1)] | Total |
|---|---|---|---|---|
| 12 | 0.029 | 0.006 | | 0.035 |
| 13 | 0.783 | 0.103 | 0.019 | 0.905 |
| 14 | 8.454 | 1.595 | 0.551 | 10.600 |
| 15 | 26.840 | 10.066 | 4.483 | 41.388 |
| 16 | 14.032 | 12.438 | 11.382 | 37.852 |
| 17 | 0.229 | 1.974 | 6.809 | 9.012 |
| 18 | | 0.176 | | 0.176 |
| Total | 50.388 | 26.368 | 23.244 | 100.000 |

[(1)]Other iso-paraffins include both multi-methyl branched species (e.g., dimethyl, trimethyl, etc.) and higher carbon number branches (e.g., ethyl, propyl, etc.).

The synthetic oil was then analyzed to determine the acute toxicity of the sample to mysid shrimp (*Mysidopsis bahia*). 10% of the oil prepared in (c) in EPA's Generic Mud #7 was tested according to the 96 hour $LC_{50}$ mysid shrimp acute toxicity test. The testing procedure used were those required by the U.S. Environmental Protection Agency to determine compliance with toxicity limitations in NPDES discharge permits for offshore oil and gas operations (EPA, 1985, 1993). The NPDES standard for discharge into the Gulf of Mexico is an $LC_{50}>30,000$ ppm of the SPP.

A preliminary range-finding test was conducted to determine appropriate concentrations to be tested during the definite test. For the range-finding test, 10 mysids were exposed to per concentrations with no replication. The concentrations for the range-finding test were: 30,000, 60,000, 125,000, 250,000, 500,000, and 1,000,000 ppm SPP (suspended particulate phase). A dilution water control was conducted concurrently. Survival of mysids in the drilling fluid and copper sulfate test solutions were analyzed and interpreted using standard techniques (Finney, 1971; Stephan, 1977). If there was any control mortality in the definitive test a maximum likelihood estimation procedure with adjustments for natural responsiveness (Finney, 1971) was used to adjust $LC_{50}$ for the natural mortality observed. The Spearman-Karber computer program was used to analyze the data to compute $LC_{50}$'s (i.e., the concentration lethal to 50% of the test organisms) and 95% confidence intervals.

The results derived from the range-finding test, the definitive test and the standard toxicant (copper sulfate) test are shown in Table 4. Mortality in the seawater control was 3.3%.

TABLE 4

Results from the Range-Finding Test, Definitive Test, and Standard Toxicant Test

| Test | $LC_{50}$ | 95% Confidence Limits |
|---|---|---|
| Range-Finding | 60,000–125,000 ppm SPP | Not Applicable |
| Definitive | 399,600 ppm SPP | 260,700–612,500 |
| Standard Toxicant | 389 µg/L Cu | 333–446 µg/L Cu | d.) It is required that drilling muds be used under a broad range of environmental conditions and climates, including very cold and arctic environments. It is therefore important that properties such as pumpability and flow are maintained at very low temperature. Pumpability and flow are typically measured experimentally using a pour point measurement.

The improved pour point performance of dibranched vs. mono-branched paraffins was experimentally determined using a series of hexadecane blends containing different amounts of mono and dibranched hexadecanes. These blends were prepared by hydroisomerizing n-hexadecane over a palladium promoted silica-alumina catalyst under fixed bed conditions of 315° C.; 1.93 w/h/w; 750 psig, and 2500 SCF/B. These conditions were sufficient to convert 93% of the n-hexadecane to branched hexadecanes and lighter paraffin products. The total liquid product of this hydroisomerization was distilled in B/R spinning band distillation apparatus equipped with a Monel band and a reflux ratio of 50:1. The first distillation fraction contained essentially all of the light paraffin products, while fractions 2–7 were composed entirely of $C_{16}$ paraffins. The n-hexadecane mono-branched hexadecane and multibranched and non-methyl branched hexadecane compositions of fractions 2–7 were determined using gas chromatography following the general assignments described in Girgas and Tsao Ind. Eng. Chem. Res., 1996, 35, 386–396. These compositions are shown in Table 5 along with the pour point of that fraction as determined by a Phase Tech Micro Pour Point Analyzer. As is clear from the table, the pour point is driven to more desirable low values by increasing the amount of multi-branched and non-methyl branched molecules in the sample. This can also be seen by plotting pour point vs. the average number of branches per molecule. The pour point increases essentially linearly with increased level of branching, as shown by Table 6.

TABLE 5

Composition and pour point of hexadecane fractions

| Distillation Cut | wt % n-$C_{16}$ | wt % monobranched hexadecane | wt % multi- and non-methyl branched hexadecane | Pour Point (° C.) |
|---|---|---|---|---|
| 2 | 1.0 | 10.3 | 87.8 | <−64 |
| 3 | 1.7 | 19.6 | 78.1 | −61 |
| 4 | 2.4 | 26.0 | 71.1 | −43 |
| 5 | 6.2 | 51.9 | 41.4 | −34 |
| 6 | 17.8 | 71.9 | 9.9 | −16 |
| 7 | 52.2 | 46.2 | 1.2 | +6 |

TABLE 6

Pour Point vs. Avg. Number of Branches/Molecule $C_{16}$ Samples

| Average Number of Branches/Molecule | Pour Point, ° F. |
|---|---|
| 0.48 | 8 |
| 0.95 | −18 |
| 1.35 | −34 |
| 1.7 | −38 |
| 1.75 | −60 |
| 1.85 | −65 |

It is apparent that various changes and modifications can be made without departing the spirit and scope of the invention.

Having described the invention, what is claimed is:

1. A substantially non-toxic, non-polluting, biodegradable drilling fluid composition useful in the production of oil and gas which comprises,
   (i) at least one additive selected from the group consisting of weighting agents, emulsifiers, wetting agents, viscosifiers, fluid loss control agents, proppants and particulate agents, emulsified with (ii) a continuous oil phase of a mixture of $C_{10}$–$C_{24}$ n-paraffins and isoparaffins having an isoparaffin:n-paraffin molar ratio ranging from about 0.5:1 to about 9:1, the isoparaffins of the mixture contains at least about 30 percent of mono-methyl species, and at least about 30 percent of isoparaffins which are multi-methyl branched or contain one or more branches of carbon number higher than methyl, based on the total weight of the isoparaffins in the mixture.

2. The composition of claim 1 wherein the mixture comprising the continuous oil phase is comprised of paraffins having a carbon number ranging from about $C_{12}$ to about $C_{18}$.

3. The composition of claim 1 wherein the mixture comprising the continuous oil phase is comprised of from about 30 percent to about 50 percent of the multi-methyl branched or one or more branches of carbon number higher than methyl.

4. The composition of claim 1 wherein the mixture comprising the continuous oil phase boils within a range of from about 320° F. to about 700° F.

5. The composition of claim 4 wherein the mixture comprising the continuous oil phase boils within a range of from about 500° F. to about 700° F.

6. The composition of claim 1 wherein the mixture comprising the continuous oil phase has a molar ratio of isoparaffins:n-paraffins ranging from about 1:1 to about 3:1.

* * * * *